Oct. 2, 1951          A. W. PETT                2,570,152
                    FLOW CONTROLLER

Filed April 10, 1946                        6 Sheets-Sheet 1

Fig.1

INVENTOR.
Alfred W. Pett
BY
    ATTORNEY

Oct. 2, 1951 A. W. PETT 2,570,152
FLOW CONTROLLER
Filed April 10, 1946 6 Sheets-Sheet 3

INVENTOR.
Alfred W. Pett
BY
Fred Bing
ATTORNEY

Oct. 2, 1951            A. W. PETT            2,570,152

FLOW CONTROLLER

Filed April 10, 1946                                6 Sheets-Sheet 4

INVENTOR.
Alfred W. Pett
BY
ATTORNEY

Fig. 10

LEVER SYSTEM TO EXTRACT
√DIFFERENTIAL FOR LINEAR SCALE

Fig. 11

⁴√LEVER SYSTEM TO EXTRACT
DIFFERENTIAL - PAROBOLIC SCALE

Patented Oct. 2, 1951

2,570,152

UNITED STATES PATENT OFFICE 2,570,152

FLOW CONTROLLER

Alfred W. Pett, Warwick, R. I.

Application April 10, 1946, Serial No. 661,160

20 Claims. (Cl. 137—152.5)

This invention relates to control apparatus for governing the flow of fluids through closed conduits, pipe lines and the like, and particularly it relates to control apparatus for so regulating such fluid flow as to attain a constant output or rate of discharge from such a conduit.

Where a fluid such as a liquid or a gas is to be transmitted through a closed conduit or pipe line from the supply end thereof to the discharge or consumption end thereof, the fluid must, of course, be under a relative pressure head at the supply end so as to induce the desired flow through the line toward and to the discharge end. Under constant conditions of supply pressure and discharge pressure in a particular section of pipe line or conduit, the output would be constant, but in practice such constant characteristics in the flow-governing or controlling factors can be attained in but rare instances. In my copending applications, Serial No. 634,521, filed December 12, 1945, now abandoned, and Serial No. 540,865, filed June 17, 1944, now Patent No. 2,399,938, issued May 7, 1946, flow control apparatus has been disclosed and claimed which enables flow of fluids in a pipe line or the like to be governed by means that are responsive to the variable factors that control the flow or output in such a pipe line and an important object of the present invention is to simplify the application of such apparatus to different kinds, types and designs of valve devices.

Further and more specific objects of the invention are to enable flow-calculating and power-controlling elements of such an apparatus to be constructed as a separate or individual unit adapted to be mounted on and operatively associated with any conventional type of power operated valve, and accomplish this result in such a manner as to enable different flow scales to be utilized as required. More specifically it is an object of the invention to enable either linear or parabolic flow scales to be utilized in such an apparatus without material changes in the apparatus.

Another object is to enable such a flow-control and power-controlling unit to sense the position of the valve member of such a valve in such a way as to translate such position into a mechanical representation of the effective valve orifice, and to enable this to be accomplished by means including a replaceable cam that serves to adapt the unit to valves having different strokes and forms of valve member.

In the practical application or use of constant flow valve means of the kind to which this invention pertains, the constant flow control means is often utilized as a secondary control means that is variably adjusted under the dominating governing action of a primary control device that is responsive to the ultimate condition which is to be controlled by the system as a whole. As an example, a temperature responsive primary control device may be associated with a room, or a liquid storage tank to measure the temperature thereof, and such room or tank may be heated by a heating fluid that flows to the room or tank through a constant flow control valve means. If the setting of the constant flow control valve means happens to be such that the temperature in the room or tank varies beyond the desired range, the primary control device, which in this instance may take the form of a thermostat, exercises its control over the constant flow control valve means so as to adjust the constant throughput of the valve in accordance with the detected variation in the primary control condition as represented by the room or tank temperature. In other instances the primary control condition may constitute a liquid level or a pressure level or condition, and hence the nature of the primary control device associated with a constant flow control means may take many different forms.

In view of the foregoing it is a further object of the present invention to provide a constant flow control means that is particularly adapted for such association with a primary control device, and a related object is to provide such a constant flow control means that has a wide range of control operation, thereby to adapt the same for convenient use with a wide variety of primary control devices.

Other and further objects of the present invention will be apparent from the following description and claims and are illustrated in the accompanying drawings which, by way of illustration show preferred embodiments and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figures 4, 5, 6:
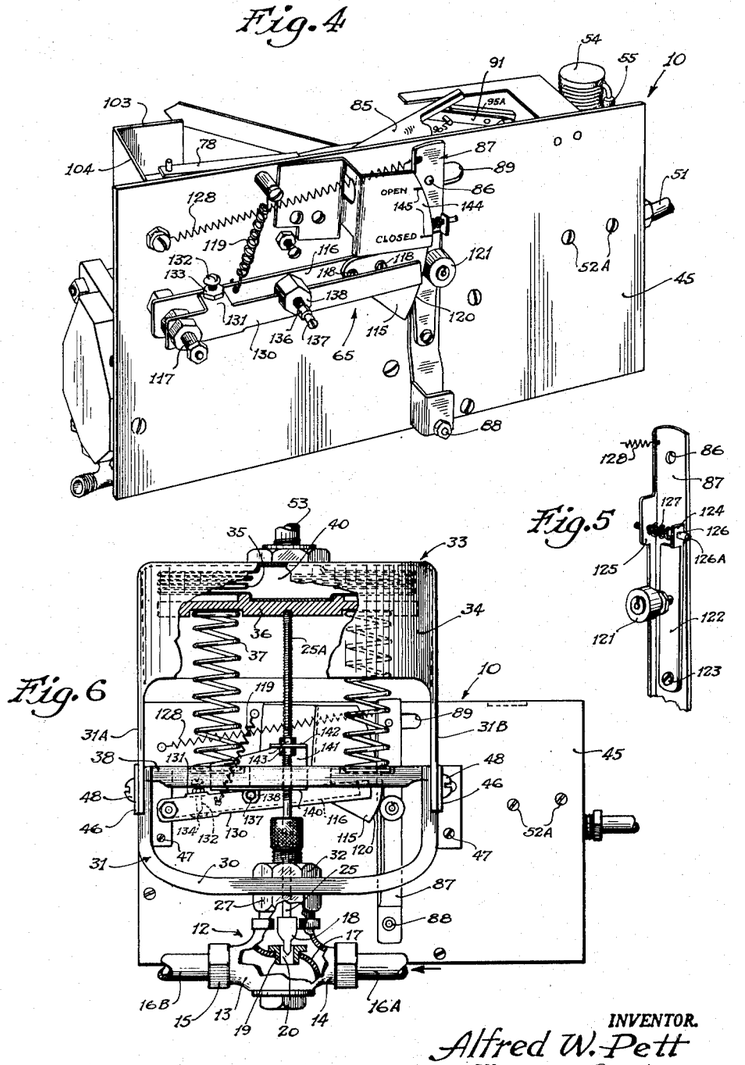
Fig. 4 is a perspective view of the rear of the computing and power control unit.
Fig. 5 is a detail view of one of the lever elements shown in Fig. 4.
Fig. 6 is a rear view, taken partially in section, of the apparatus shown in Fig. 1.

In the form chosen for disclosure in Figs. 1 to 8 of the drawings the invention is embodied in a flow control apparatus comprising a flow-calculating and power control unit 10 mounted on and operatively associated with a conventional power operated valve unit 11 to produce an adjustably predetermined constant flow through the valve 12 of the unit 11, and in accordance with the present invention the flow-calculating and power control unit 10 is of such a character as to be readily adapted for operative association with different sizes and types of valves as well as for operation with different flow scales such as a linear flow scale or a parabolic flow scale. The valve 12 as shown in Fig. 6, has a valve casing 13 having inlet and outlet ends 14 and 15 into which inlet and outlet sections 16A and 16B of a pipe line may be threaded, and generally diagonally of and within the valve casing 13 a division wall 17 is provided for cooperation with a valve member 18 in controlling flow of fluid through the casing 13. The division wall 17 has an opening therein in which a valve seat bushing or member 19 is mounted, and in the form of the invention disclosed in Figs. 1 to 8, the valve member 18 is so related to the valve seat 19 that when the valve is in its upper position, and valve opening 20 in the bushing 19 is open to the maximum, and when the valve 11 is to be closed the valve member 18 is moved downwardly. Such movement of the valve member 18 is attained through vertical or longitudinal movement of a valve stem 25 that extends upwardly from the valve member 18 and through a conventional packing gland formed in a mounting boss 27 on the top of the valve housing 13.

The mounting boss 27 has an externally threaded portion formed thereon about the packing gland, and the transverse member 30 of a yoke 31 is mounted on the threaded upper portion of the boss 27 and is held in place by a lock nut 32 threaded onto the boss 27.

Figure 1:
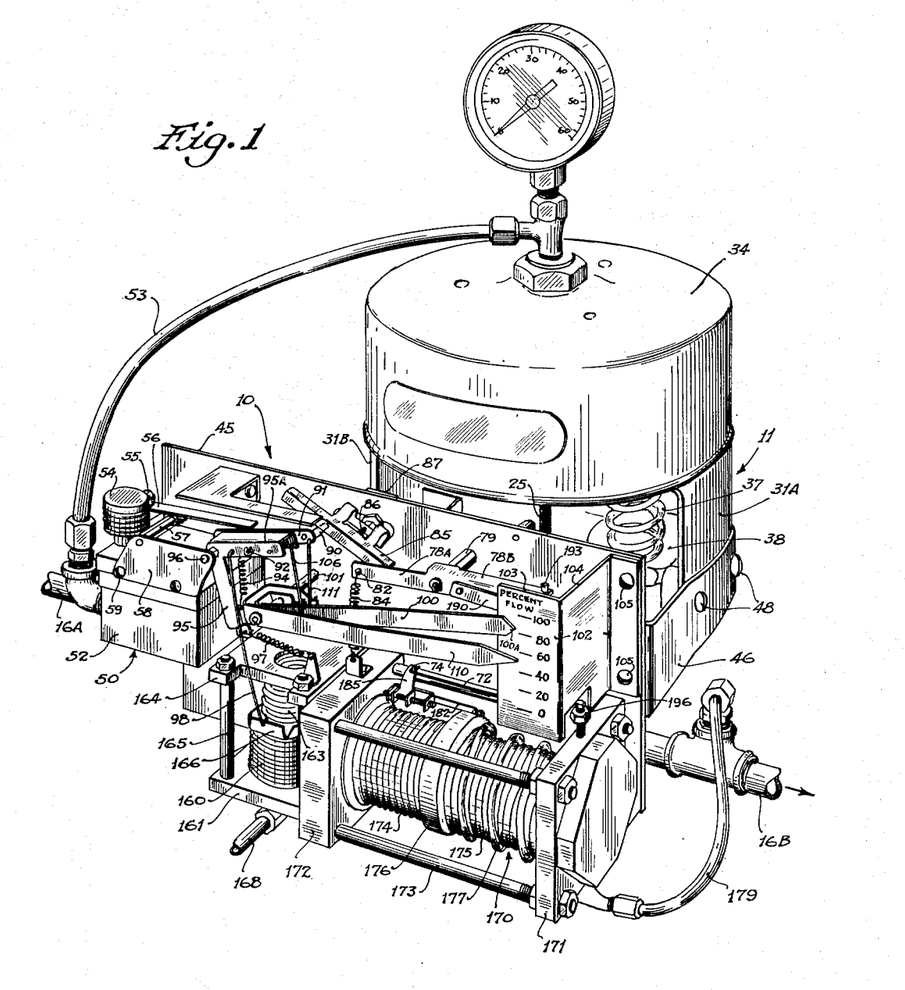
Fig. 1 is a perspective view showing control apparatus embodying the features of the invention.
Figures 2, 3:
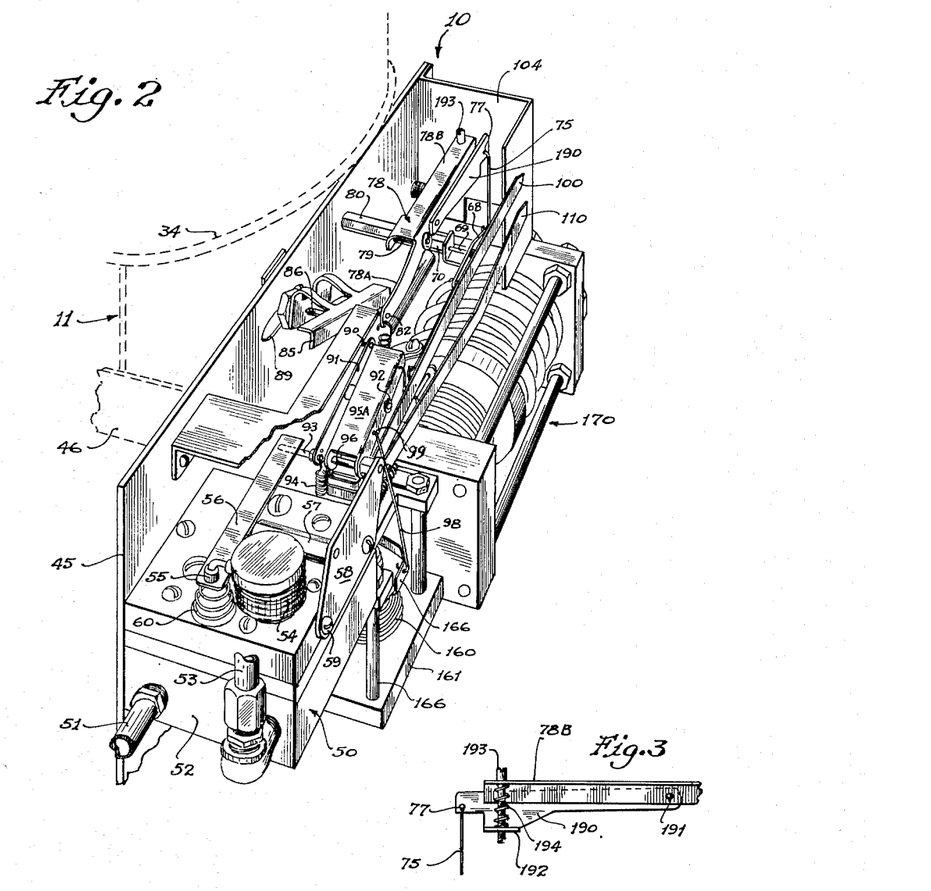
Fig. 2 is a perspective view of the front of the computing and power control unit.
Fig. 3 is a detail view of one of the levers of the computing system.

The yoke 31, as herein shown, serves as a support for the means that actuate and control the position of the valve member 18, and in the present instance the valve actuating means 33 are disposed at the upper end of the two spaced and detachably mounted arms 31A and 31B of the yoke 31. While it will be understood that such valve actuating means 33 may take many different forms and may be arranged to utilize many different kinds of operating power, the present embodiment of the invention employs pressure fluid operated actuating means 33 that are operated by a pressure fluid such as air. Thus, as shown in Figs. 1 and 6 of the drawings, the arms 31A and 31B are formed as integral downward extensions of the side walls of an inverted pan-shaped member or housing 34 that is supported by the arms 31A and 31B so as to be concentric with the valve stem 25, and within the housing 34 an extensible bellows 35 is mounted so as to act between the upper wall of the housing and the upper face of a plate 36 that is in turn fixed on the upper end of the valve stem 25. The plate 36 is urged upwardly by a pair of expansive coil springs 37 that are carried on a cross bar 38 extended between the sides of the yoke 31. Hence the valve member 18 is urged toward its open position, and by application of a pressure fluid to the chamber 40 within the bellows 35, the valve member 18 may be forced downwardly toward its closed position.

In accordance with the present invention the flow-computing and power-control unit 10 is so constructed and arranged as to be readily associated with a power operated valve unit 11 of the general character thus afforded, and to this end the unit 10 has a plate-like main frame 45 that may be rigidly secured to the valve unit 11 by means of a pair of rigid mounting arms 46 that are secured by screws 47 to the rear face of the plate 45 and which engage opposite outer faces of the arms of the yoke 31 and are secured thereto by screws 48. The mounting plate 45 that is thus adapted to be rigidly mounted on a valve unit serves to support a power-control means 50 for governing the supply of pressure fluid to the pressure chamber 40, and in association with the power control means 50, the plate 45 supports computing means, as will hereinafter be described in detail, that are responsive conjointly to the effective valve opening and instantaneous pressure differential across the valve opening to govern the power control means 50 and thereby cause regulation of flow through the valve at a predetermined adjustably set value.

The power control means 50 as herein shown are of the pneumatic relay type and may be of conventional construction wherein a constant pressure supply of a pressure fluid such as compressed air is connected by a supply pipe 51 to a relay valve mechanism 52 which is secured on the forward face of the plate 45 by screws 52A, and the output of the relay valve mechanism 52 is transmitted to the pressure chamber 40 by a pipe connection 53. The output of the relay valve mechanism is controlled and varied by a vent nozzle 55 and a cooperating flapper valve 56, and the nozzle 55 may, if desired, be mounted on bellows 54 in the manner and for the purpose disclosed in my prior Patent No. 2,331,799, patented October 12, 1943. It may also be noted that the relay valve mechanism 52 may be of the character disclosed in my aforesaid prior Patent No. 2,331,799. The flapper valve 56 is pivoted intermediate its ends on a horizontal pivot stud 57 extended from a vertical plate 58 mounted in an upwardly extending relation on the forward face of the casing of the relay valve mechanism 52 by screws 59. A spring 60 acts on the flapper valve 56 to urge the same toward the nozzle 55, and the flapper valve 56 is moved away from the nozzle 55, or in an opening direction, by the calculating means as will now be described. As will hereinafter become apparent, the relationship of the flapper valve 56 to the calculating means determines the value or quantity of the constant flow that is to be maintained through the valve 13, and means is therefore provided for adjusting this relationship, as will hereinafter be described in detail.

Considering the desired constant flow that is to be maintained as being a selected percentage of the rated maximum flow for the valve 13, the relationship of the calculating means to the flapper valve 56 is first set or adjusted according to a percentage flow scale as will hereinafter be apparent, and the calculating means included in the unit 10 are then operative to so control the flapper valve 56 that the valve member 18 is adjusted and readjusted as required to establish and maintain the percentage flow for which the mechanism has been set. Such governing or calculating means are so constructed and arranged as to be responsive to those ultimate factors that tend to vary and control the flow through the valve 13, such factors being the effective opening or area of the valve opening 20 and the differential pressure that is effective across such valve opening.

Considered broadly, the means that are thus effective to control the flapper valve 56 constitute means for solving mechanically the equation of flow through an orifice or restriction in a pipe line, and for applying the results of such solution to the flapper valve 56 in such a way as to vary the setting of the valve 18 until the flow through the valve opening 20 equals the flow-quantity or percentage established by the aforesaid setting of the mechanism. Thus, it will be recognized that, disregarding constants, the flow of a liquid through an orifice such as the orifice 20 is equal to the effective area of such orifice times the square root of the pressure differential across such orifice, and it is this formula or relationship that is solved and applied to the flapper valve 56.

In the attainment of such operation, the pressure differential effective across the valve orifice 20 is measured in such a manner as to afford a mechanical or positional representation of such differential, and such representation of the differential is applied to a primary calculating means which is operable to compute a predetermined root of the differential, such as the square root or the four root thereof, and the function of the differential that is thus obtained is mechanically or positionally represented in such a way that it may be entered as a factor into a second calculating means that serves to multiply such function of the differential by another factor representing the effective opening at the valve orifice 20. The factor that is representative of the effective valve opening is determined by the position of the valve member 18 and the valve stem 25, and such position is translated into a mechanical representation of the effective valve opening by translating mechanism 65, mounted on the rear face of the plate 45 as shown in Fig. 4, and adapted to be operatively associated with the valve stem 25.

The particular form of the invention illustrated in Figs. 1 to 7 and 10 of the drawings is adapted for operation in accordance with a linear flow scale, and the primary or first calculating means is arranged to compute the square root of the differential exhibited across the valve orifice, but as will hereinafter become apparent, this first calculating means is so arranged and is so related to the other or related elements of the structure that means for calculating the fourth root of the differential may be readily substituted where operation according to a parabolic flow scale is desired. Thus, as will be evident in the schematic illustration of Fig. 10, and also in Fig. 2, the first calculating or root extracting means comprises a bell crank lever 68, having arms 68A and 68B, pivoted on a horizontal pivot 69 fixed on the forward end of a stud 70 extended forwardly from the front face of the plate 45. The angular relationship between the arms 68A and 68B is such that when the arm 68A is disposed at an angle of ten degrees below a horizontal line 71 passing through the pivot 69, the arm 68B will be disposed twenty degrees below the line 71 and on the other side of the pivot 69. With this arrangement the differential may be applied as movement to the arm 68A to rock the bell crank 68 in such a manner that the vertical position of the end of the arm 68B represents the square root of the differential. Thus a relatively long link 72 is pivoted at 73 to the end of the arm 68A, and is extended generally horizontally to a pivot 74 that is movable horizontally in a manner to be disclosed presently to represent the differential that is detected across the valve orifice. The scale of movement of the pivot point 74 is represented in Fig. 10 as between four percent and one hundred percent of the differential since it is not contemplated that the valve mechanism will be called upon to function automatically below four percent of the maximum, and moreover, where a calculating lever 68 is to be employed for extracting the square root of the differential, the power required to rock the lever 68 in the lower differential range would be excessive.

Figure 10:
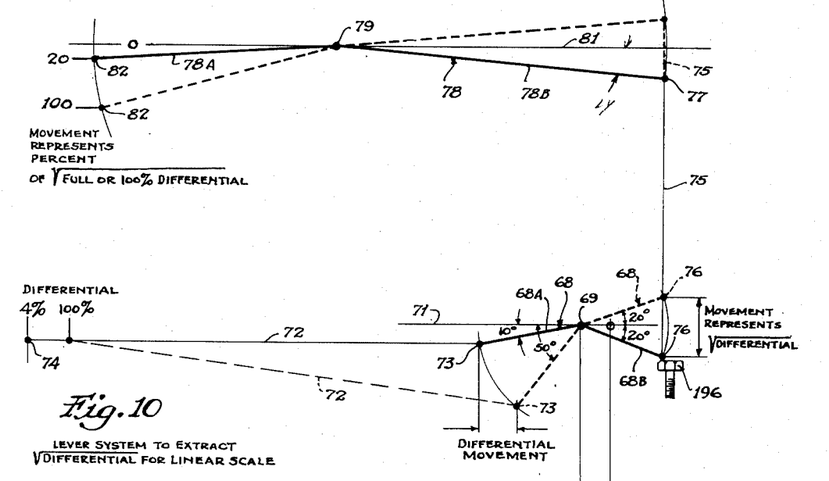
Fig. 10 is a schematic view of the manner in which the lever system is connected where the square root of the pressure differential is to be entered into the flow computing mechanism to thereby afford control according to a linear flow scale.

As the pivot 74 is moved to the right in Fig. 10, the link 72 acts to rock the lever 68 in a counterclockwise direction from the full line position thereof toward the dotted line position thereof, and in the course of such rocking movement of the lever 68 the vertical movement or position of the end of the arm 68B constitutes at all times a representation of the square root of the differential. The representation that is thus afforded of the square root of the differential is transmitted to a generally vertical link 75 that is pivoted at its lower end by a pivot 76 to the end of the arm 68B, and the upper end of the link 75 is connected by a pivot 77 to one end of a bell cran'. 78. The bell crank 78 is pivoted on a pivot pin 79 has relatively long arms 78A and 78B, and it is to the arm 78B that the link 75 is pivoted. It will be observed in the movement of the pivot 74 along its scale from four to one-hundred percent of the differential, the lever 68 is rocked through forty degrees of angular movement so that the arm 68B moves from twenty degrees below the line 71 to twenty degrees above the line 71, and the length of the link 75 and the length of the arm 78B are such that a generally similar range of movement is imparted to the pivot 77. In other words, the arrangement is such that when the arm 68B is horizontal, the arm 78B will also be horizontal, and the range of movement imparted to the arm 78B above and below a horizontal line 81 passing through the pivot 79 will be equal as the lever 68 moves through its forty degree range as aforesaid.

When the lever 68 is in the full line position of Fig. 10, the position of the pivot 76 is representative of the square root of a four percent differential, which is equal to twenty percent of the square root of the full one-hundred percent differential, and the arm 78A of the lever 78 is so related to the arm 78B that when these parts are positioned in the full line relation of Fig. 10, a pin 82 at the end of the arm 78A will be positioned to represent twenty percent of the square root of the full or one-hundred percent differential. Thus, by taking a location of the pin 82 on the horizontal line 81 as zero on such a scale, and considering the full angular range of the arm 78B between its full and dotted line positions as being eighty percent of amount of angular movement that would be required to traverse the full one-hundred percent on such a scale, the arm 78A is so related to the arm 78B that when the arm 78 is in its full line position, the arm will be disposed at an angle A below the line 81 which is equal to one-fourth of the angle between the full line and horizontal positions of the arm 78B. Hence when the arm 78B is moved to its dotted line position, the pin 82 will be disposed in a position representative of one-hundred percent of the square root of the full differential. With this arrangement the intermediate positions of the pin 82 will be on a linear scale so that the pin 82 will throughout such range of movement constitute a mechanical representation of the square root of the full or one-hundred percent differential. Any backlash in the various pivotal connections is taken up by a spring 84 acting on the arm 78A to urge the same in a downward direction.

The mechanical representation that is thus afforded by the position of the pin 82 constitutes one factor that is utilized in solving the equation of flow, for this mechanical representation is at all times equal to the square root of the percentage of the full or maximum differential. The other factor that is to be entered into the solution of the equation of flow is the percentage of the effective valve opening, and these two factors are applied to a multiplying lever 85 that is pivoted intermediate its ends on a pivot pin 86. The pivot pin 86 is supported on a carrier 87 that is in the present case in the form of a lever disposed on the rear face of the mounting plate 45 and pivoted near the lower edge thereof on a pivot pin 88. The lever 87 extends from the bottom of the plate 45 substantially to the top thereof, and the pin 83 is mounted in the lever 87 and is extended forwardly through a slot 89 formed in the plate 45 so that the multiplying lever 85 is disposed forwardly of the forward face of the plate 45. Thus the pivot 86 of the multiplying lever 85 may be moved in a generally horizontal direction by rocking movement of the lever 87, and it is by such rocking movement of the lever 87 that the factor that represents the percentage of effective valve opening is entered into the multiplying operation. The other factor, that is the square root of the percentage of the effective differential is entered into the multiplying operation by having the pin 82 bear upon the straight lower edge of the multiplying lever 85, as will be evident in Figs. 1, 7 and 8 and hence the angularity of the multiplying lever 85 may be changed either by pivotal movement of the lever 78 or by horizontal shifting movement of the pivot pin 86 of the multiplying lever 85. The pin 82 is so related to the multiplying lever 85 that the point of engagement between the pin 82 and the lever 85 is at all times located to the right of the pivot 86 and the result of the multiplying operation that is effected by the lever 85 is manifested by the position of a pin 90 that bears upwardly against the lower edge of the multiplying lever 85 at a point which is at all times located to the left of the pivot 86, although in some cases the pin 90 may move into alignment with the pivot 83.

The pin 90 is mounted on the right hand end of a transmitting lever 91 that is supported intermediate its end on a pivot 92, and the other or left hand end of the transmitting lever 91 has a pin 93 thereon that bears against the lower face of the right hand end of the flapper valve 56. A spring 94 acting on the lever 91 serves to urge the left hand end of the lever 91 downwardly, thereby to maintain the pin 90 in engagement with the multiplying lever 85, and this in turn holds the right hand end of the multiplying lever 85 downwardly against the pin 82. Thus the result of the calculating operation, as it is exhibited or manifested in the position of the pin 90 is transmitted through the lever 91 and the pin 93 to the flapper valve 56 and when the pin 93 is moved upwardly, the flapper valve 56 is moved away from the nozzle 55 against the normal closing action of the spring 60 that will be clearly apparent in Figs. 2 and 3 of the drawings.

When the present device is to be set so as to maintain any desired percentage of flow, the action of the calculating means upon flapper valve 56 must be modified so that the normal position of flapper valve 56 with respect to the nozzle 55 will be maintained when the calculated flow is equal to the desired flow, and when this adjustment is attained, the calculating means will disturb the normal relationship of the flapper valve 56 when the computed flow differs from the desired flow.

Such adjustment is effected by mounting the pivot pin 92 for substantially vertical adjustment, and this is accomplished by supporting the pivot pin 92 on one arm 95A of a bell crank 95, this bell crank being pivoted on a pivot stud 96 that is extended in a rearward direction from the upper left hand portion of the mounting plate 58. A spring 97 acting on the lower end of the arm 95 urges the bell crank 95 in a counterclockwise direction so as to tend to lift the bell crank arm 95A and the pivot pin 92 in an upward direction, and the adjusting action on the bell crank 95 is attained through means including a vertical adjusting link 98 that is pivoted at a pivot 99 on the arm 95A of the bell crank. The means for applying adjusting movement to the link 98 will be described in detail hereinafter.

In order that the adjustment for which the apparatus is set may be visually indicated, a pointer 100 is mounted on a pivot stud 101 that extends forwardly from the plate 45, and the end 100A of the pointer 100 is arranged to move along an appropriate scale 102 formed on a flange 103 of a plate 104 that is secured by screws 105 to the plate 45 adjacent the right hand end thereof. The pointer 100 is operated from the arm 95A of the bell crank 95 by a link 106 that is pivoted at its opposite ends to the arm 95A and to the pointer 100. Similarly, a pointer 110 is mounted on the stud 101, and has the end thereof arranged to move along the scale 102, and the pointer 110 is connected by the link 111 to the lever 91 adjacent to the pin 90, and hence the pointer 110 serves as an indicator to indicate the instantaneous flow through the valve 13.

The rocking movement of the lever 87, Figs. 4 and 6, that is required in order to enter the percentage of effective valve opening into the multiplying operation is effected by the translating mechanism 65 that is carried on the rear face of the plate 45, and this is accomplished by operatively associating a translating cam 115 with the valve stem 25 and with the lever 87 so that movement of the valve stem will be transmitted to the cam 115 and will be translated by the cam into movement of the lever 87 that is representative of the percentage of effective valve opening. Thus the cam 115 is mounted at one end of a lever 116 that is pivoted at its other end on a pivot 117 extended rearwardly from the plate 45. The cam 115 is secured in position by screws 118 so as to be readily put in place on the lever, and the lever 116 is biased in an upward direction by a spring 119. The cam 115 has a cam edge or surface 120 that is arranged to bear against a cam roller 121 that is mounted on the lever 87. In the present instance, the cam roller 121 is mounted on a short lever 122 that is pivoted at 123 on the lever 87, the cam roller 121 being disposed intermediate the pivot 123 and an ear 124 formed on the other end of the lever 122. An ear 125 is formed on the arm or lever 87 and a headed screw 126 is extended through the ear 124 and is threaded through the ear 125. A spring 127 surrounds the screw between the two ears 124 and 125 so as to hold the ear 124 against the head 126A of the screw. Thus a finely adjustable relationship between the roller 121 and the lever 87 is afforded. The lever 87 is pivoted or urged in a counterclockwise direction Fig. 4 by a spring 128, and thus the roller 121 is held against the edge 120 of the cam 115.

The movement of the valve stem 25 is transmitted to the lever 116 and the cam 115 by a connecting means that enables the mechanism to be adapted readily to valves having different structures, and this mechanism is also of such a character to enable the location of the range of movement to be readily adjusted and adapted for different valves. Thus a loosely mounted transmitting lever 130 is pivoted on the pivot stud 117 and this lever 130 has a laterally projecting ear 131 formed thereon so as to project forwardly and toward the lever 116. An adjustable screw 132 having a lock nut 133 thereon is extended downwardly through the ear 131 and the lower end of the screw 132 is arranged to engage a rearwardly projecting lug 134 that is formed on the lever 116. Thus the lever 116, being urged upwardly by the spring 119, serves through the ear 134, the screw 132, and the ear 131, to support the arm 133, and when the valve stem 25 moves downwardly, such movement is transmitted to the lever 130 and through the screw 132 to the lever 116. In accomplishing this actuation of the lever 130, a cylindrical surface 133 is formed on a screw 137 which in turn projects into a slide block 138 that is slotted so as to embrace the offset edge of the ear 131, and the slide block 138 may be screwed in any position along the lever 130 by tightening of the screw 137. The screw 137 projects in a rearward direction so that the cylindrical portion 136 thereof affords a bearing surface that is disposed beneath a horizontal lower edge 140 that is afforded on a transmitting plate 141. The transmitting plate has an ear 142 on its upper edge that is put into position with a threaded portion 25A of the valve stem 25 projecting through the ear 142. The ear 142 is held in position on the threaded portion 25A of the valve stem by nuts 143 that are threaded on the valve stem above and below the ear 142. Thus the horizontal edge 140 of transmitting plate 141 moves up and down with the valve stem 25, and the action of the spring 119 on the levers 116 and 130 holds the bearing 136 in engagement with the surface 140. Thus the cam 115 is moved up and down in accordance with the movements of the valve member 18, and by reason of the form of the cam edge 120 of the cam 115, such movement of the cam 115 is effective to translate the movements of the valve member into mechanical representations of the percentage of effective valve opening. To aid in adjusting the relationship between the valve stem and the movements of the cam 115 a bracket 144 is mounted on the plate 45 and is provided with a scale 156 which cooperates with an edge or mark on the cam 115 to indicate whether or not the vertical range of movement of the cam 115 is of the proper extent and is properly located.

Figure 12:
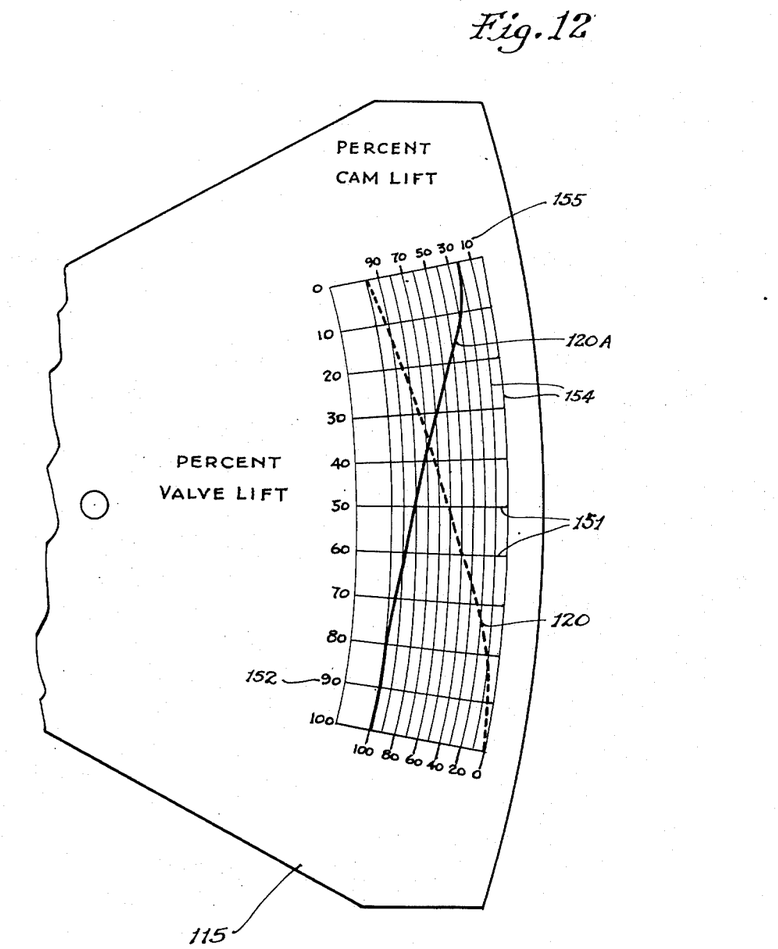
Fig. 12 is a diagrammatic view illustrating the manner in which the translating cam is developed for any particular valve design and valve stroke.

In Fig. 12 of the drawings an enlarged illustration of the cam 115 is shown and the general method of laying out the cam surface 120 is shown. Thus a plurality of lines 154 are provided which are arcuately related to the center that is to be afforded by the pivot 117, these lines 154 being arranged along the scale 155 so that each line 154 indicates a ten per cent increment in the range of movement of the pivot 86 of the calculating means. A plurality of other lines 151 are also provided in spaced relation, these lines being radial and being centered upon the axis that will be afforded by the pivot 117. The lines 151 are arranged along the scale 152 in such a manner that the respective lines 154 are disposed at ten percent increment of the total range of movement or stroke of the valve member that is to be utilized. In other words the scale 152 represents a linear percentage scale of the valve stroke while the scale 155 represents a linear percentage scale of the cam lift or rise that is to be afforded in order to impart the necessary shifting movement to the pin 86 and the multiplying lever 85.

As the next step in calculating the cam form, the value of the effective valve opening required for each ten percent or scale position of the pivot 86 is determined by calculation according to the flow equation and the flow scale that is to be used, and then from the valve characteristic and stroke of the valve that is to be used, the valve positions required to afford the different effective valve areas are determined. The values thus determined are then plotted on the lines 151 and 154 so as to thereby give the form of the cam surface 120. In Fig. 12, a dotted cam outline 120 is illustrated which is adaptable for use with a particular kind of valve which opens as an incident to upward movement of the valve member 18. In full lines in Fig. 12, a valve outline or surface 120A is illustrated which is adaptable for one form of valve that opens the valve as an incident to downwardly movement of the valve member, as 18.

It has been pointed out hereinbefore that the setting of the desired flow is attained by vertical actuation of the link 98. This setting or adjustment may of course be manual, or may be attained automatically where a primary control is utilized as a rest control for the present control apparatus. In the present embodiment of the invention, means are afforded for either manually or automatically setting the flow that is to be maintained, and for this purpose a bellows 160 is supported at its lower end on a mounting plate 161 that is rigidly secured to the plate 45 so as to project outwardly therefrom near the lower edge thereof. The upper end of the bellows 160 has a pressure plate 162 fixed across the closed upper end wall 162A thereof, and an expansive coil spring 163 is arranged at its lower end to engage the pressure plate 162. The upper end of the spring 163 bears against a top plate 164 that is supported in spaced relation to the plate 161 by bolt and spacer devices 165 so that the spring 163 acts normally to urge the pressure plate 162 downward, thereby to tend to compress the bellows 160. The lower end of the link 98 is pivotally connected to an upstanding ear 166 that is provided on the pressure plate 162 so that by vertical movement of the pressure plate 162, the flow setting of the apparatus may be adjusted. The flow setting may be automatically adjusted by application of a control air pressure to the bellows 160 as by means of a connection 168, and such a connection may be extended to a primary control instrument such as a thermostat. The flow may also be manually adjusted through the medium of a screw 170 that is extended upwardly through the plate 161 so that the upper end of the screw 170 may bear against a wear plate 162B fixed on the inner or lower face of the upper end wall 162A of the bellows 160. Through this arrangement, the pressure plate 162 may be adjusted upwardly by the screw 170 and in such adjustment the spring 163 is of course compressed.

Figure 7:
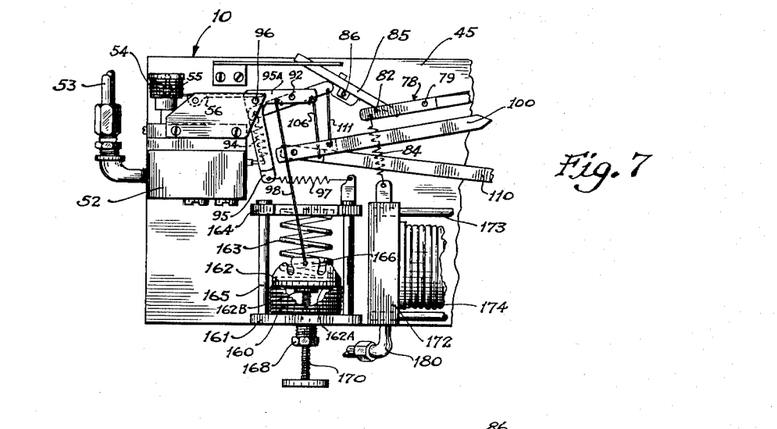
Fig. 7 is a fragmentary front elevational view of the computing and power control unit.
Figure 8:
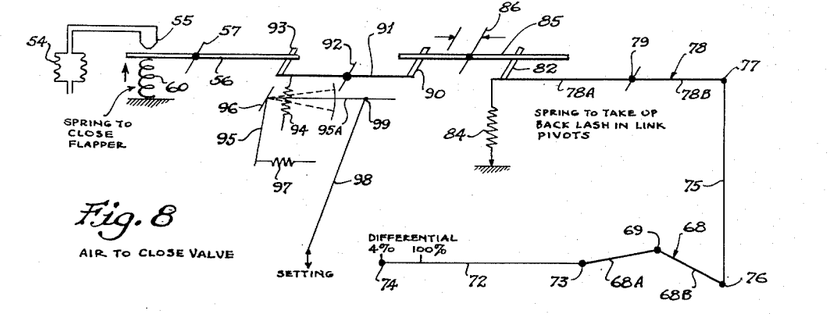
Fig. 8 is a schematic view of the computing and power control means as employed in the structure of Figs. 1 to 7 where the valve is spring urged toward open position and is moved toward closed position by power such as pressure air.

The application of the pressure differential to the pivot 74 and thence through the link 72 to the calculating or root extracting lever 68 may be accomplished by means which also serves to measure and determine such differential, but under some circumstances it may be desirable or more convenient to locate the expansive elements of a pressure differential measuring means remotely or externally with respect to the flow control mechanism. In the present embodiment of the invention however a pressure differential measuring device 170 is mounted directly on the plate 45 on the forward face thereof. The pressure differential measuring device 170 comprises a pair of end plates 171 and 172 connected by spacer bolts 173 and rigidly secured to the forward face of the plate 45. Between the plates 171 and 172 a pair of bellows 174 and 175 are mounted in alignment with a central plate 176 disposed therebetween. The sealed ends of the bellows 174 and 175 are disposed in locating recesses in opposite faces of the central plate 176, while the other ends of the bellows 174 and 175 are sealed respectively to the end plates 172 and 171. A balancing spring 177 surrounds the bellows 175 and acts between plates 171 and 176. The pressure on the down stream or low pressure side of the valve 13 is applied through a connection 179 to the interior of the bellows 175, such connection being extended through the end plate 171 in a conventional manner. Similarly, a connection 180 from the interior of the bellows 174 is extended from the plate 172, as shown in Fig. 7, and is connected to the pipe section 16A so as to apply the high pressure or up stream pressure in the pipe to the bellows 174. The up stream and down stream pressures are thereby balanced one against the other and the position of the central plate 172 constitutes a linear representation of the pressure differential exhibited across the orifice of the valve 13. This pressure differential is applied to the pivot 74 by means including a rigid arm 182 fixed to the central plate 176 and extending longitudinally therefrom as shown in Fig. 1. On the arm 182, a longitudinally adjustable bracket 185 is provided and it is with the bracket 185 that the pivot 74 is associated in the present instance. Thus the mechanical representation of the pressure differential that is afforded by the position of the bracket 185 is applied to the link 72 so as to thereby impart the requisite movements to the calculating lever 68. It will be recognized that the initial position of the lever 68 is important, and this may readily be adjusted by the adjustment of the bracket 185 along the arm 182. In the course of such adjustment of the initial position of the arm 68, the initial position of the transmitting arm 78 may be disturbed, and as will be evident in Figs. 2 and 3, the connection of the link 75 to the arm 78B is adjustable in character. Thus the arm 78B has a second arm 190 pivoted thereon as at 191, and the upper end of the link 75 has its pivot 77 connected to the extended end of the lever 190. The lever 190 has a laterally extending ear 192 formed thereon and a threaded screw 193 is extended downwardly through the arm 78B and is threaded through the ear 192. An expansive spring 194 surrounds the screw 193 between the lever arm 78B and the ear 192, and thus by adjustment of the screw 193, the initial position of the lever 78 may readily be adjusted in the event this position has been disturbed by adjustment of the bracket 185.

In practice it has been found desirable to limit the counterclockwise movement of the calculating lever 68 so that such movement will be stopped when the arm 68A has moved to a point that is ten degrees away from the line 71 as shown in full lines in Fig. 10 of the drawings, and for this purpose an adjustable stop 196 Figs. 1 and 10 is provided so as to be disposed in the path of the arm 68B. This insures that the arm 68 will be unable to reach a point where the power available in the differential measuring device will be insufficient to move the lever 68 in a counterclockwise direction.

Figure 9:
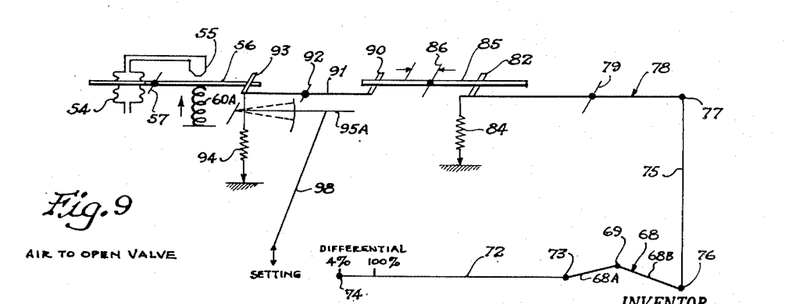
Fig. 9 is a schematic view of the computing and power control means such as would be employed where the valve is spring urged toward closed position and is moved toward open position by power such as pressure air.

It will be recognized that in the embodiment of the invention shown in Figs. 1 to 8 and 10 the invention has been applied to a power operated valve unit wherein the valve is normally urged toward open position and has air pressure or other pressure applied thereto to close the valve. The control apparatus of the present invention may however be readily changed so as to serve as a control for a valve that is normally spring urged toward closed position and has air pressure or other pressure applied thereto in order to produce opening movement of the valve member. The simplicity of such revisions will be readily apparent in the diagrammatic illustrations of Fig. 9. Thus the entire train of mechanism from the introduction of the pressure differential at the pivot 74 to the pin 93 is exactly the same as in the previous described embodiment of the invention. Moreover, the flapper valve 56 is similarly supported, but the nozzle 55 is supported on the bellows 54 so as to be disposed over the right hand end of the flapper valve 56. With this arrangement, a spring 60A is arranged to act upwardly on the right hand end of the flapper valve, thereby to urge the flapper valve 56 toward the nozzle 55, and the right hand end of the flapper valve 56 is disposed beneath the pin 93, thereby reversing the relationship of the flapper valve 56 to the pin 93 and to the nozzle 55. With the arrangement that is thus afforded, the apparatus of the present invention may be utilized where a normally closed valve is to be opened and controlled by air pressure to produce a constant flow through the valve.

Figure 11:
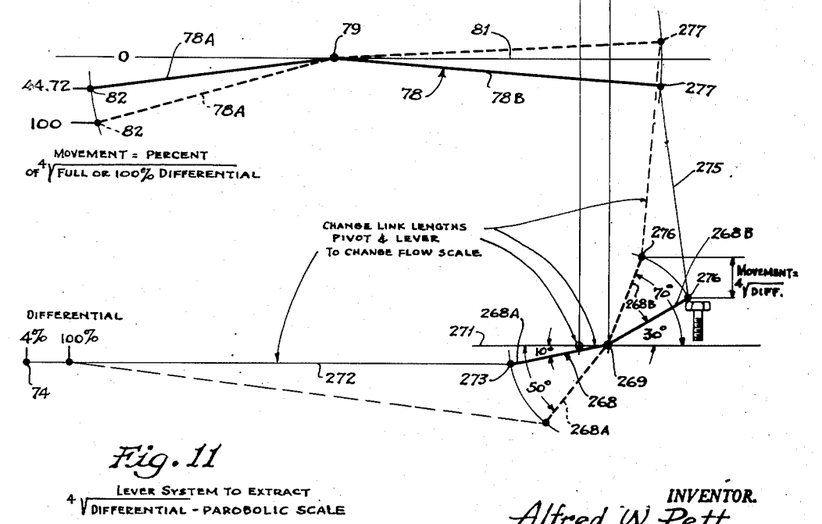
Fig. 11 is a schematic view of the manner in which the lever system is connected where the fourth root of the pressure differential is to be entered into the flow computing mechanism to thereby afford control according to a parabolic flow scale.

In the previously described embodiments of the invention, the apparatus has been illustrated and described as being adapted to operate upon a linear flow scale, but the apparatus of the present invention may readily be changed so as to adapt the same for operation on a parabolic flow scale. Such an arrangement is diagrammatically illustrated in Fig. 11 of the drawings and the necessary structural revisions that are involved comprise the removal of the link 72, the lever 68, the pivot 69 and the link 75, and different parts are substituted for the parts thus removed. Thus a bell crank lever 268, mounted on a pivot 269 that is displaced somewhat to the right of the location of the pivot 69. The bell crank 268 has an arm 268A that is so arranged that its initial position, shown in full lines in Fig. 11, is ten degrees below a horizontal line 271 passing through the pivot 269. A link 272 is connected between the pivot 74 and a pivot 273 on the end of the arm 268A, and when the pivot 74 moves from its four percent position to its one-hundred percent position, the arm 268A is moved from the initial position that is ten percent below the line 271, through an angle of forty degrees to the dotted line position which is fifty degrees below the line 271.

The bell crank 268 has a second arm 268B that is so related to the arm 268A that when the arm 268A is in its initial or full line position, the arm 268B will be disposed thirty degrees above the line 271. Thus when the arm 268A moves through its forty degrees stroke, the arm 268B will be moved through forty degrees to the dotted line position of Fig. 11. The end of the arm 268B is connected at a pivot 276 to the lower end of a link 275 which is connected at its upper end 277 to the arm 78B of the lever 78.

The arrangement of the links and levers is such that when the arm 268B is in its full line or initial position, the arm 78A of the lever 78 will be disposed so that the pin 82 will be located so as to indicate substantially 44.72 percent along the scale that relates to the pin 82. Thus when the arm 268B has moved to its dotted line position of Fig. 11, the arm 78A will have been moved to such a position that the pin 82 is located at a one-hundred percent position along the related scale. The factor that is thus derived as a fourth root function of the differential is thus introduced in by the pin 82 into the calculating operation that is to be effected by the multiplying lever 85, and the control apparatus will therefore operate according to a parabolic flow scale.

The foregoing description of the root extracting levers 68 and 268 has been confined merely to the structural characteristics and relationships thereof, but it may be observed that both of these root extracting levers operate upon the broad principles set forth in Patent No. 2,003,839, patented June 4, 1935, on the application of Ed S. Smith, Jr. According to the method of root extraction that is explained in the aforesaid Smith patent, use is made of versed sine relationship which throughout a certain range of angles is such as to vary substantially in accordance with the square root. Thus in the embodiment of the invention that is arranged to operate according to a linear flow scale, the differential representing element 74 and the root-extracting lever 68 are so related that when the differential representing element 74 moves through its complete or 100% range of movement, the link 72 will cause or allow the lever 68 to move through a range of 50° of annular movement, for it has been determined experimentally that throughout this arrangement, the versed sine of the angle between the line 71 and the arm 68A varies substantially in accordance with the square foot of the value that is represented by the position of the pivot 74.

Since the angular position of the lever arm 68A is thus representative of substantially the square root of the represented differential, it is desirable that this positional representation be transmitted to the transmitting lever 78 with the greatest possible accuracy that is consistent with simplicity of structure, and it is for this reason that the lever arm 68B is arranged to move in equal amounts above and below the horizontal line 71, it being observed that the link 75 is substantially perpendicular to the line 71 at all times.

The lever 268 that is utilized to extract the fourth root of the differential operates substantially like the lever 68 in that the angular position thereof is representative of the square root of the differential, but the arm 268B is so arranged with respect to the arm 268A that the arm 268B utilizes the variations in the sine relationship so as to afford a representation of the fourth root of the differential. It is for this reason that the range of movement of the arm 268B is from 30° to 70° with respect to the horizontal line 271. Throughout this range of angular movement, the point 276, in its vertical component of movement, moves according to the sine relationship so that the vertical movements of the pivot 276 represent substantially the fourth root of the represented differential.

From the foregoing description it will be apparent that the present invention materially simplifies the application of flow control apparatus to different kinds, types and designs of valve devices and according to the present invention the flow calculating and flow or power controlling elements of the apparatus may be embodied in a separate or individual unit that is of such a character that it may readily be mounted on and operatively associated with any conventional type of power operating valve. Under and in accordance with the present invention these advantageous results are attained in such a manner that different flow scales may readily be utilized as may be required, and such changes in the character of the flow scale may be attained without material changes in the apparatus.

The flow controller of the present invention, through the utilization of a replaceable cam in translating the valve movement of the terms of effective valve orifice is readily adaptable for quantity production because through the use of such replaceable cams the flow controlling and flow calculating unit may readily be adapted for different kinds and types and sizes of valves.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. In a flow control apparatus for association with a power operated flow control valve, a unit adapted to be mounted on the casing of such a flow control valve, means on said unit adapted when said unit is mounted on a valve casing to be moved in accordance with the movements of the valve member of the valve, means on said unit operated by said last mentioned means and including a cam means for translating movement of said last mentioned means into a movement which is a function of a predetermined character, means on said unit actuated by differential pressure and adapted to be actuated in accordance with the pressure differential at opposite sides of the valve opening of the valve, a settable control means on said unit adapted to govern the operation of the power means of the power operated valve, and computing means for governing said control means and conjointly controlled in accordance with the second mentioned means and said means actuated by differential pressure.

2. In a flow control apparatus for association with a power operated flow control valve, a unit having a mounting frame adapted to be mounted on the casing of a flow control valve, means on said frame adapted when said unit is mounted on such a valve casing to be moved in accordance with the movements of the valve member of the valve, means on said frame operated by said last mentioned means and including a cam means for translating movement of said last mentioned means into a movement which is a function of a predetermined character, differential representing means on said frame actuated by differential pressure and adapted to be actuated in accordance with the pressure differential exhibited at opposite sides of the valve opening of the valve, root extracting lever means operated by said differential representing means and operable to extract a predetermined root of the represented differential, a settable control means on said frame adapted to govern the operation of the power means of the power operated valve, and computing means mounted on said frame and governing said control means and conjointly controlled in accordance with said second mentioned means and said root extracting lever means.

3. In a flow control apparatus for association with a power operated flow control valve, a unit adapted to be mounted on the casing of a flow control valve, means on said unit adapted when said unit is mounted on such a valve casing to be moved in accordance with the movements of the valve member of the valve, means on said unit operated by said last mentioned means and including a cam means for translating movement of said last mentioned means into a movement which is a function of a predetermined character, differential representing means on said unit actuated by differential pressure and adapted to be moved in accordance with the pressure differential at opposite sides of the valve opening of such valve, a further means on said unit operated by said differential representing means for translating movement of said differential representing means into a movement representing a predetermined root of the differential, a settable control means on said unit for governing the operation of the power means of the power operated valve, and computing means governing said control means and conjointly controlled in accordance with said second mentioned means and said further means.

4. In a flow control apparatus for association with a power operated flow control valve, a unit adapted to be mounted on the casing of a flow control valve, means on said unit adapted when said unit is mounted on a valve casing to be moved in accordance with the movements of the valve member of the valve, means on said unit operated by said last mentioned means and having operatively associated therewith for translating movement of said last mentioned means into a movement which is a function of a predetermined character, differential representing means on said unit operated by differential pressure and adapted to be actuated in accordance with the pressure differential at opposite sides of the valve opening of the valve, root extracting lever means mounted on said unit and operated by said differential representing means for translating movement of said differential representing means into a movement which is representative of a predetermined root of the differential, a settable control means on said unit for governing the operation of the power means of the power operated valve, a computing lever governing said control means, a shiftable support upon which said computing lever is pivoted and shifted by said cam in accordance with the movement of the moved member, and a transmitting lever of substantial length operated by said root extracting lever means and operable to rock said computing lever in accordance with the position of said root extracting lever means.

5. In a flow control apparatus for association with a power operated flow control valve, a unit adapted to be mounted on the casing of a flow control valve, a lever mounted on said unit, an abutment mounted on said lever and adapted for adjustment therealong and further adapted when said unit is mounted on the valve casing to be actuated in accordance with the movements of the valve member of the valve, a translating cam mounted on said unit and actuated by said lever for translating movement of said abutment into a movement that is a function of a predetermined character, means on said unit actuated by differential pressure and adapted to be actuated in accordance with the pressure differential at opposite sides of the valve opening of the valve, a settable control means on said unit for governing the operation of the power means of the power operated valve, and computing means for governing said control means and conjointly controlled in accordance with said translating cam and said means actuated by differential pressure.

6. In a regulator apparatus for association with a valve having a casing affording inlet and outlet passages with a valve orifice between said passages and a valve member shiftable with respect to said orifice to vary the effective valve orifice area and having power operated actuating means for said valve member mounted on said valve casing and operatively connected to said valve member, a control unit for the power operated actuating means of the valve comprising a frame, computing means mounted on said frame and adapted for entry therein of a first factor constituting a function of the differential of the pressures exhibited on opposite sides of the orifice of such a valve and a second factor constituting a function of the effective area of such valve orifice, and said computing means being operable in response to entry of such factors to compute and manifest the instantaneous flow through said valve, control means mounted on said frame for controlling the power operated means of the valve operatively associated with said computing means to control such a valve in accordance the result computed and manifested by said computing means, means mounted on said frame and including a cam adapted to be operated by the valve member for entering said second factor into said computing means, and means adapted to be actuated by pressures on opposite sides of the orifice for entering said first factor into said computing means.

7. In a regulator apparatus, a valve having a casing affording inlet and outlet passages with a valve orifice between said passages and a valve member shiftable with respect to said orifice to vary the effective valve orifice area, power operated actuating means for said valve member mounted on said valve casing and operatively connected to said valve member, a control unit for said power operated actuating means comprising a frame, computing means mounted on said frame and adapted for entry therein of a first factor constituting a function of the differential of the pressures exhibited on opposite sides of said orifice and a second factor constituting a function of the effective area of said valve orifice, and said computing means being operable in response to entry of such factors to compute and manifest the instantaneous flow through said valve, means mounted on said frame for controlling said power operated means operatively associated with said computing means to operate said valve in accordance with the result computed by said computing means, means including a cam operated by said valve member for entering said second factor into said computing means, and means controlled by pressures on opposite sides of said orifice for entering said first factor into said computing means.

8. In a regulator apparatus, a valve having a casing affording inlet and outlet passages with a valve orifice between said passages and a valve member shiftable with respect to said orifice to vary the effective valve orifice area, power operated actuating means for said valve member mounted on said valve casing and operatively connected to said valve member, a control unit for said power operated actuating means comprising a frame, computing means mounted on said frame and adapted for entry therein of a first factor constituting a function of the differential of the pressures exhibited on opposite sides of said orifice and a second factor constituting a function of the effective area of said valve orifice, and said computing means being operable in response to entry of such factors to compute and manifest and represent the instantaneous flow through said valve, means for controlling said power operated means, a transmitting lever operable to transmit the representation of instantaneous flow to said controlling means to effect operation of said valve in accordance with the result computed by said computing means, means adjustably supporting the transmitting lever for varying the effectiveness of said transmitting lever on said controlling means, means including a cam operated by said valve member for entering said second factor into said computing means, and means controlled by pressures on opposite sides of said orifice for entering said first factor into said computing means.

9. In a regulator apparatus, a valve having a casing affording inlet and outlet passages with a valve orifice between said passages and a valve member shiftable with respect to said orifice to vary the effective valve orifice area, power operated actuating means for said valve member mounted on said valve casing and operatively connected to said valve member, a control unit for said power operated actuating means comprising a frame, a first computing lever mounted on said frame for rocking movement, a differential representing means mounted on said frame and movable along a linear path and according to a linear scale to afford a representation of the differential of the pressures exhibited on opposite sides of said orifice, a link connected to said differential representing means and to said first computing lever and operable to rock said lever according to the versed sine relation to represent by angular movement of said lever the substantial square root of the differential represented by said differential representing means, a second computing lever, link and lever means operated by said first computing lever and operable to introduce the square root of said differential into said second computing lever, means for introducing a second factor into said second computing lever constituting a function of the effective area of said valve orifice, and said second computing lever being operable in response to entry of such factors to compute and manifest the instantaneous flow through said valve, and means for controlling said power operated means operatively associated with said second computing lever to operate said valve in accordance with the result computed by said second computing lever.

10. In a flow control apparatus, a unit adapted for association with a power operated flow control valve, said unit having a mounting frame adapted to be mounted on the casing of the flow control valve, means on said frame adapted when said unit is mounted on the valve casing to be moved in accordance with the movements of the valve member of the valve, means on said frame operated by said last mentioned means and including a translating cam for translating movement of said last mentioned means into a movement which is a function of a predetermined character, differential representing means on said frame actuated by differential pressure and adapted to be actuated in accordance with the pressure differential exhibited at opposite sides of the valve opening of such valve, root extracting lever means operated by said differential representing means and operable to extract and afford a mechanical representation of a predetermined root of the represented differential, a settable governing means on said frame for governing the operation of the power means of the power operated valve, computing means mounted on said frame and conjointly controlled in accordance with said second mentioned means and said root extracting lever means, and adjusting means for varying the effectiveness of said computing means on said governing means to thereby enable the desired constant flow to be maintained by an associated valve to be adjustably set.

11. In a regulator apparatus, a control unit adapted for association with a valve having a casing affording inlet and outlet passages with a valve orifice between said passages and a valve member shiftable with respect to said orifice to vary the effective valve orifice area and power operated actuating means for said valve member mounted on said valve casing and operatively connected to said valve member, said control unit comprising a frame, a first computing lever mounted on said frame for rocking movement, a differential representing means mounted on said frame actuated by differential pressure and movable along a linear path and according to a linear scale to afford a representation of the differential of the pressures exhibited on opposite sides of said orifice, a link connected to said differential representing means and to said first computing lever and operable to rock said lever according to the versed sine relation to represent by angular movement of said lever the substantial square root of the differential represented by said differential representing means, a second computing lever, link and lever means operated by said first computing lever and operable to rock said second computing lever in accordance with the angular movement of said first computing lever, means for translating movement of the valve member into a movement that is a function of a predetermined character and operatively connected to said second computing lever for transmitting said last mentioned movement to said second computing lever as a second factor constituting a function of the effective area of said valve orifice, and said second computing lever being operable when this actuated to compute and manifest the instantaneous flow through said valve, and means for controlling the power operated means of a valve and operatively associated with said second computing lever for controlling the valve in accordance the result computed by said second computing lever.

12. In a regulator apparatus, a unit adapted for association with a power operated valve having a casing affording inlet and outlet passages with a valve orifice between said passages and a valve member shiftable with respect to said orifice to vary the effective valve orifice area, said control unit comprising a frame, computing means mounted on said frame and adapted for entry therein of a first factor constituting a function of the differential of the pressures exhibited on opposite sides of the orifice of the valve and a second factor constituting a function of the effective area of the valve orifice of the valve and said computing means being operable in response to entry of such factors to compute and manifest and represent the instantaneous flow through said valve, means for controlling the power operated means of the valve, a transmitting lever operatively connected to said computing means and operable to transmit the representation of instantaneous flow to said controlling means in accordance with the result computed by said computing means, means adjustably supporting the transmitting lever for varying the effectiveness of said transmitting lever on said controlling means, means including a cam adapted to be operated by the valve member of the valve for entering said second factor into said computing means, and means controlled by pressures on opposite sides of the orifice for entering said first factor into said computing means.

13. In a flow control apparatus for association with a power operated flow control valve, a unit adapted to be mounted in an operative relation with respect to a flow control valve, means on said unit adapted when said unit is mounted on such a valve casing to be moved in accordance with the movements of the valve member of the valve to afford a mechanical representation of the position of said valve member, means on said unit operated by said last mentioned means and including a translating cam means for translating movement of said last mentioned means into a movement which is a function of a predetermined character, differential representing means on said unit actuated by differential pressure and adapted to be actuated in accordance with the pressure differential at opposite sides of the valve opening of the valve, root extracting lever means mounted on said unit and operated by said differential representing means to extract and represent by the position thereof a predetermined root of the differential, a settable control means on said unit for governing the operation of the power means of the power operated valve, a computing lever, a first transmitting lever through which said computing lever is operatively associated in governing relation with said control means, a shiftable support upon which said computing lever is pivoted and shifted by said cam, a second transmitting lever operated by said root extracting lever means and operable to rock said computing lever in accordance with the position of said root extracting lever means, and means for adjusting the position of said first transmitting lever to enable the effectiveness of said first transmitting lever on said computing lever to be adjusted.

14. In a regulator apparatus, a valve having a casing affording inlet and outlet passages with a valve orifice between said passages and a valve member having a valve stem and shiftable with respect to said orifice to vary the effective valve orifice area, power operated actuating means for said valve member mounted on said valve casing and operatively connected to said valve stem for operating said valve member, a control unit for said power operated actuating means comprising a platelike frame mounted on said valve, computing means mounted on said frame so as to be disposed on the side face of said frame that is remote from said valve and adapted for entry therein of a first factor constituting a function of the differential of the pressures exhibited on opposite sides of said orifice and a second factor constituting a function of the effective area of said valve orifice, and said computing means being operable in response to entry of such factors to compute and manifest the instantaneous flow through said valve, means mounted on said frame for controlling said power operated means operatively associated with said computing means to operate said valve in accordance with the result computed by said computing means, a lever mounted on the side face of said frame that is adjacent to said valve and having means thereon for entering said second factor into said computing means, means controlled by pressures on opposite sides of said orifice for entering said first factor into said computing means, an operating bracket for said lever mounted on said valve stem and having an abutment surface thereon that is perpendicular to said valve stem, and means operatively associated with said lever and disposed in the path of said abutment surface so that said lever is actuated by said valve stem in its movements.

15. In a regulator apparatus, a valve having a casing affording inlet and outlet passages with a valve orifice between said passages and a valve member having a valve stem and shiftable with respect to said orifice to vary the effective valve orifice area, power operated actuating means for said valve member mounted on said valve casing and operatively connected to said valve stem for operating said valve member, a control unit for said power operated actuating means comprising a plate-like frame mounted on said valve, computing means mounted on said frame so as to be disposed on the side face of said frame that is remote from said valve and adapted for entry therein of a first factor constituting a function of the differential of the pressures exhibited on opposite sides of said orifice and a second factor constituting a function of the effective area of said valve orifice, and said computing means being operable in response to entry of such factors to compute and manifest the instantaneous flow through said valve, means mounted on said frame for controlling said power operated means operatively associated with said computing means to operate said valve in accordance with the result computed by said computing means, a lever mounted on the side face of said frame that is adjacent to said valve and having a cam thereon for entering said second factor into said computing means, means controlled by pressures on opposite sides of said orifice for entering said first factor into said computing means, an operating bracket for said lever mounted on said valve stem and having an abutment surface thereon that is perpendicular to said valve stem, an abutment element operatively associated with said lever and disposed in the path of said abutment surface so that said lever is actuated by said valve stem in its movements, and means for adjusting said element along said lever.

16. In a regulator apparatus, a valve having a casing affording inlet and outlet passages with a valve orifice between said passages and a valve member having a valve stem and shiftable with respect to said orifice to vary the effective valve orifice area, power operated actuating means for said valve member mounted on said valve casing and operatively connected to said valve stem for operating said valve member, a control unit for said power operated actuating means comprising a plate-like frame mounted on said valve, computing means mounted on said frame so as to be disposed on the side face of said frame that is remote from said valve and adapted for entry therein of a first factor constituting a function of the differential of the pressures exhibited on opposite sides of said orifice and a second factor constituting a function of the effective area of said valve orifice, and said computing means being operable in response to entry of such factors to compute and manifest the instantaneous flow through said valve, means mounted on said frame for controlling said power operated means operatively associated with said computing means to operate said valve in accordance with the result computed by said computing means, a lever mounted on the side face of said frame that is adjacent to said valve and having a cam thereon for entering said first factor into said computing means, means controlled by pressures on opposite sides of said orifice for entering said first factor into said computing means, an operating bracket for said lever mounted on said valve stem and having an abutment surface thereon that is perpendicular to said valve stem, and means operatively associated with said lever and disposed in the path of said abutment surface so that said lever is actuated by said valve stem in its movements.

17. In a flow-calculating and power controlling unit for governing the power driven actuating means of a valve, a plate-like frame having a rear mounting face and a front mounting face, means for securing said frame in position on a valve with said rear face toward the valve, a motion-translating means mounted on said rear face of said frame for actuation by and in proportion to the movements of the valve member of the valve, said motion translating means including a motion translating cam replaceably associated therewith for translating movement of the valve member into a movement that is a function of a predetermined character, a carrier mounted on said plate for movement by said cam and including a pivot pin disposed on the forward face of said frame, a power control means mounted on the forward face of said frame and adapted for controlling the power driven actuating means of the valve, a multiplying lever pivoted on said pivot pin and operatively associated with said power control means for governing said power control means, a differential representing means on said forward face of said frame actuated by differential pressure and adapted to be moved linearly in accordance with the differential exhibited across the orifice of such a valve, root-extracting means mounted on the forward face of said frame and operatively associated with said differential representing means to extract a predetermined root of the represented differential, and means operated by said root extracting means to apply the resulting root to said multiplying lever.

18. In a flow control unit for governing the power driven actuating means of a valve, a plate-like frame having a rear mounting face and a front mounting face, means for securing said frame in position on a valve with said rear face toward said valve, a motion-translating means mounted on said rear face of said frame for actuation by and in proportion to the movements of the valve member of the valve, said motion translating means including a motion translating cam replaceably associated therewith for translating movement of the valve member into a movement that is a function of a predetermined character, a carrier mounted on said plate for movement by said cam and including a pivot pin disposed on the forward face of said frame, a power control means mounted on the forward face of said frame and adapted for controlling the power driven actuating means of the valve, a multiplying lever pivoted on said pivot pin, means including a second carrier and a transmitting lever carried thereby effective to operatively associate said multiplying lever with said power control means for governing said power control means, means operable on said second carrier to set the transmitting lever of said second carrier for different flows, a differential representing means on said forward face of said frame actuated by differential pressure and adapted to be moved linearly in accordance with the differential exhibited across the orifice of such a valve, root-extracting means mounted on the forward face of said frame and operatively associated with said differential representing means to extract a predetermined root of the represented differential, means operated by said root extracting means to apply the resulting root to said multiplying lever, a first indicating means operable by said second carrier to indicate the flow for which the mechanism is set, and a second indicating means operable by said multiplying lever to indicate the instantaneous flow.

19. In a flow-calculating and power controlling unit for governing the power driven actuating means of a valve, a frame adapted to be secured in position on a valve, motion-translating means on said frame for actuation by the valve member of the valve for translating movement of the valve member into a movement that is a function of a predetermined character, a differential representing element mounted on said frame and actuated by differential pressure and adapted to be moved linearly in accordance with the differential exhibited across the orifice of the valve, a root extracting bell crank lever pivotally mounted on said frame and having one arm thereof moved by said differential representing element to utilize the versed sine relation to afford by angular positioning of said lever a representation of the square root of the differential, said bell crank lever having a second arm the end of which moves along a path utilizing the sine relation to afford a representation of the square root of the square root represented by the angular position of said lever, and calculating means actuated by said second arm and said motion translating means for calculating the instantaneous flow through the valve, and governing means controlled by said calculating means for governing the power operated actuating means of the valve.

20. In a flow-calculating and power controlling unit for governing the power driven actuating means of a valve, a plate-like frame having a rear mounting face and a front mounting face, means for securing said frame in position on a valve with said rear face toward said valve, a motion-translating means mounted on said rear face of said frame for actuation by and in proportion to the movements of the valve member of such a valve, and including cam means for translating movements of the valve member into movement that is a function of a predetermined character, a carrier mounted on said plate for movement by said motion-transmitting means and including a pivot pin disposed on the forward face of said frame and adapted for controlling the power driven actuating means of such a valve, a multiplying lever pivoted on said pivot pin and operatively associated with said power control means for governing said power control means, a differential representing means on said forward face of said frame actuated by differential pressure and adapted to be moved linearly in accordance with the differential exhibited across the orifice of the valve, root-extracting means mounted on the forward face of said frame and operatively associated with said differential representing means and means operated by said root extracting means to apply the resulting root to said multiplying lever.

ALFRED W. PETT.

REFERENCES CITED

The following references are of record in the file of this patent:

UNITED STATES PATENTS

| Number | Name | Date |
|---|---|---|
| 1,952,648 | Andrews et al. | Mar. 27, 1934 |
| 2,035,166 | Kimball | Mar. 24, 1936 |
| 2,220,176 | Rosenberger | Nov. 5, 1940 |
| 2,303,890 | Moore | Dec. 1, 1942 |
| 2,353,692 | Cunningham | July 18, 1944 |
| 2,388,457 | Ziegler | Nov. 6, 1945 |
| 2,399,938 | Pett | May 7, 1946 |